(12) United States Patent
Morel (10) Patent No.: US 7,523,540 B2
(45) Date of Patent: Apr. 28, 2009

(54) DEVICE FOR POSITIONING AND AFFIXING MAGNETS TO A MAGNETIC YOKE MEMBER OF A MOTOR

(75) Inventor: Jean-Pierre Morel, Les Fourgs (FR)

(73) Assignee: Etel S.A., Motiers, Swiss Confederation ( * ) Notice: Subject to any disclaimer, the term of this patent is extended or adjusted under 35 U.S.C. 154(b) by 507 days.

(21) Appl. No.: 11/123,689

(22) Filed: May 5, 2005

(65) Prior Publication Data

US 2005/0246886 A1    Nov. 10, 2005

(30) Foreign Application Priority Data

May 7, 2004    (CH)    .................................... 0813/04

(51) Int. Cl.
 *H02K 15/00*  (2006.01)
(52) U.S. Cl. .................... 29/596; 29/423; 29/455.1; 29/598; 29/608; 29/719; 29/732; 310/12; 310/43; 310/74; 310/153; 310/156.08
(58) Field of Classification Search .................. 29/596, 29/423, 455.1, 598, 608, 719, 732; 310/12, 310/43, 74, 153, 156.08
See application file for complete search history.

(56) References Cited

U.S. PATENT DOCUMENTS

| 4,623,345 | A | * | 11/1986 | Laby | ........................ 604/93.01 |
| 5,584,114 | A | * | 12/1996 | McManus | ..................... 29/596 |
| 5,962,937 | A | | 10/1999 | Wavre | |

FOREIGN PATENT DOCUMENTS

EP    0 871 284    10/1998

* cited by examiner

*Primary Examiner*—Thiem Phan
(74) *Attorney, Agent, or Firm*—Kenyon & Kenyon LLP (57) ABSTRACT

A device for positioning and affixing magnets on a magnetic yoke member of an electric motor includes: a nonmagnetic support for receiving the magnets; a magnetic element for holding the magnets in position on the nonmagnetic support arranged on the other side of the nonmagnetic support with respect to the magnets, the attraction exerted by this element on the magnets greater than that exerted by the magnetic yoke member during positioning of the device with respect to the yoke; a device for varying the magnetic forces present, whereby the magnetic attraction of the magnetic yoke member and/or the magnetic element on the magnets may be varied such that the magnetic force of attraction exerted by the yoke on the magnets becomes greater than that exerted by the magnetic element on them, thus provoking transfer of the magnets to the yoke.

8 Claims, 8 Drawing Sheets

DEVICE FOR POSITIONING AND AFFIXING MAGNETS TO A MAGNETIC YOKE MEMBER OF A MOTOR

CROSS-REFERENCE TO RELATED APPLICATIONS

The present application claims priority to Application No. 00813/04, filed in Switzerland on May 7, 2004, which is expressly incorporated herein in its entirety by reference thereto.

FIELD OF THE INVENTION

The present invention relates to a method and device for positioning and affixing magnets on the magnetic yoke member of a motor.

BACKGROUND INFORMATION

A conventional linear motor includes a stator provided with permanent magnets and a mobile element provided with at least one excitation coil. Such a linear motor, for example, is described in European Published Patent Application No. 0 871 284, where it is used in an X-Y table. The stator includes a magnetic yoke member on which are positioned a series of juxtaposed magnets of alternating north-south polarity. It is important that the magnets be carefully positioned in parallel to one another and that a constant pole pitch be maintained. These magnets are, in general, affixed by gluing. When these magnets are brought in proximity with the magnetic yoke member, the force of attraction created between the yoke and the magnets may make precise positioning of the magnets on that yoke difficult except on an assembly line having special equipment that may be costly and cumbersome. The operation of gluing magnets on a magnetic yoke member is almost impossible manually.

Gluing magnets on a motor yoke member may present a major problem whenever that yoke is an integral part of the equipment frame in which the motor is integrated. Attachment of the magnets at the installation site may be preferable and desirable, e.g., for linear motors of a certain length.

A robot may be used to perform this operation of positioning and affixing magnets to the magnetic path of a linear motor. This solution may have the disadvantage of requiring a significant investment and a great deal of time to glue all the magnets.

On the other hand, the use of tools to install magnets along a horizontal path is conventional. This method, therefore, requires horizontal access throughout the length of the magnetic path to install the magnets, which is an impediment but always possible. Moreover, the tooling used for this horizontal installation is fragile and ill suited to gluing techniques.

It may be possible to glue magnets that have not yet been magnetized, the actual magnetization of the magnets occurring after they have been glued to the magnetic yoke member of the motor. If, in this case, gluing of the magnet occurs without problems, because of the absence of magnetic attraction, this solution may nevertheless require a very considerable investment, e.g., with respect to the magnetization tooling, and also may require lengthy cycle time for each magnet.

SUMMARY

An example embodiment of the present invention may provide the ability to position then affix, e.g., by gluing, magnets to a magnetic yoke member of an electric motor, e.g., to form the magnetic path of a linear motor, without being disturbed by the magnetic attraction this yoke exerts on the magnets, e.g., in the facility where the motor is built or at the site where it will be assembled and/or used, and without the use of a costly and/or cumbersome device.

In an example embodiment of the present invention, a method for positioning and affixing magnets on a magnetic yoke member of a motor includes: an arrangement of magnets on a face of a nonmagnetic support and the maintenance of those magnets in position on the nonmagnetic support through the attraction of a magnetic element that is disposed on the other side of the nonmagnetic support with respect to the magnets; positioning of the nonmagnetic support with respect to the magnetic yoke member, with the magnets facing that yoke, those magnets being held in place against the support by the attraction of the magnetic element acting counter to the force of attraction of the magnetic yoke member, this latter force being less than that of the magnetic element upon the magnets; a variation of magnetic forces acting upon the magnets such that the relationship of magnetic forces present is reversed as a result of a decrease of the force of attraction of the magnetic element and/or an increase of that of the yoke member, provoking the detachment of the magnets from this nonmagnetic support and their transfer to the magnetic yoke member; and at least partial attachment of the magnets to the magnetic yoke member and withdrawal of the nonmagnetic support.

This method also may include, prior to the magnetic support positioning step, a step for depositing glue on the face of the magnets intended to be glued to the magnetic yoke member, the magnets thus being disposed, while being positioned on the nonmagnetic support, with their glued face oriented toward the magnetic yoke member, the magnet attachment step includes gluing the magnets on the magnetic yoke member, withdrawal of the nonmagnetic support from the magnetic yoke member taking place after the glue has dried or polymerized, thus ensuring attachment of the magnets to the magnetic yoke member.

The variation of magnetic forces acting on the magnets may be obtained at least partially by bringing together the support-magnetic element assembly, secured by the magnetic force of attraction between the magnetic element and the magnets of the magnetic yoke member of the motor; and/or the variation of magnetic forces acting on the magnets is obtained at least partially by withdrawal of the magnetic element relative to the nonmagnetic support.

In an example embodiment of the present invention, a device for positioning and affixing magnets on a magnetic yoke member of a motor includes a nonmagnetic support for accepting magnets, this having a shape complementary to that of the magnetic yoke member on which the magnets are to be glued, a magnetic element for maintaining the magnets in position on the nonmagnetic support, this element being disposed on the other side of this support with respect to the magnets, the attraction exerted by the magnetic element on the magnets being greater than that exerted by the magnetic yoke member during the positioning of the device with respect to the yoke, a device for varying the magnetic forces present capable of varying the magnetic attraction of the magnetic yoke member and/or the magnetic element on the magnets such that the magnetic force of attraction exerted by the yoke upon the magnets becomes greater than that exerted by the magnetic element on them.

The magnetic force varying device may include an arrangement for displacing the nonmagnetic support and the magnetic element in the direction of the magnetic yoke member so as to increase the magnetic attraction of the yoke on the magnets and/or the magnetic force variation device may have an arrangement for displacing the magnetic element to separate it from the nonmagnetic support and from the magnets positioned in the latter.

The nonmagnetic support may include fins on its magnet receiving surface to maintain them in a position corresponding to that provided for on the motor yoke. It is possible to provide that during the disposition of the magnets on the nonmagnetic support, the magnetic element is initially distant from them.

An aspect of example embodiments of the present invention is, therefore, to vary the distance between the magnets held by a nonmagnetic support in the device and, on the one hand, a magnetic part of the device that holds the magnets in place on this support and, on the other hand, the magnetic yoke member of the motor intended to receive those magnets. It is thus possible to vary the magnetic forces of attraction present, the magnetic attraction of the yoke on the magnets being initially compensated by a greater magnetic attraction arising from the device itself during the initial steps of the method serving to position the magnets, which may allow for great precision in positioning magnets on the yoke and may not require complex tooling.

According to an example embodiment of the present invention, a method for positioning and affixing magnets to a magnetic yoke member of a motor includes: arranging magnets on a face of a nonmagnetic support and maintaining the magnets in position on the nonmagnetic support by a force of attraction of a magnetic element, the magnetic element arranged on a side of the nonmagnetic support opposite to the face; positioning the nonmagnetic support with respect to the magnetic yoke member with the magnets facing the magnetic yoke member and with the magnets held in position by the attraction of the magnetic element against a force of attraction of the magnetic yoke member, the force of attraction of the magnetic yoke member less than the force of attraction of the magnetic element; varying magnetic forces acting on the magnets to at least one of (a) decrease the force of attraction of the magnetic element and (b) increase the force of attraction of the magnetic yoke element; detaching the magnets from the nonmagnetic support; attaching the magnets to the magnetic yoke member; at least partially affixing the magnets on the magnetic yoke member; and withdrawing the nonmagnetic support from the magnetic yoke member.

The method may include, before the positioning step, depositing glue on a face of the magnets to be glued to the magnetic yoke member so that, during the positioning of the nonmagnetic support, glue-covered faces of the magnets are oriented toward the magnetic yoke member. The at least partially affixing step may include gluing the magnets on the magnetic yoke member, the withdrawing step being performed after at least one of (a) sufficient drying and (b) sufficient polymerization of the glue to provide at least preliminary attachment of the magnets to the magnetic yoke member.

The varying step may include bringing together an assembly of the nonmagnetic support and the magnetic element, held together by a magnetic force of attraction of the magnets with the magnetic element of the magnetic yoke member of the motor.

The varying step may include separating the magnetic element from the nonmagnetic support.

The arranging and maintaining step may include increasing retention of the magnets in position on the nonmagnetic support by attractive effect of the magnetic element after arranging the magnets by bringing together the nonmagnetic support and the magnetic element.

According to an example embodiment of the present invention, a device for positioning and affixing magnets to a magnetic yoke member of a motor includes: a nonmagnetic support adapted to receive the magnets, a shape of the nonmagnetic support complementary to a shape of the magnetic yoke member; a magnetic element adapted to hold the magnets in position on the nonmagnetic support, the magnetic element arranged on an opposite side of the nonmagnetic support than the magnets, the magnetic element adapted to exert a magnetic attraction on the magnets greater than a magnetic attraction exerted by the magnetic yoke member during positioning of the device with respect to the magnetic yoke member; and an arrangement adapted to vary at least one of (a) the magnetic attraction of the magnetic yoke member on the magnets and (b) the magnetic attraction of the magnetic element on the magnets to render the magnetic attraction of the magnetic yoke member on the magnets greater than the magnetic attraction of the magnetic element on the magnets.

The arrangement may be adapted to displace the nonmagnetic support and the magnetic element in a direction of the magnetic yoke member to increase the magnetic attraction of the magnetic yoke member on the magnets.

The arrangement may be adapted to displace the magnetic element to separate the magnetic element from the nonmagnetic support without reduction of a separation between the magnets and the magnetic yoke member.

The nonmagnetic support may include fins arranged on a disposition surface for the magnets adapted to retain the magnets in position.

The magnetic element may be arranged as a lower part of a chassis, and the chassis may include vertical rods adapted to secure the magnetic element to an upper plate.

The nonmagnetic support may be joined to a cap mounted to slide along the vertical rods of the chassis, and the magnetic element may be arranged between the nonmagnetic support and an upper part of the cap.

The device may include a housing vertically movable with respect to the chassis. The housing may include an arrangement adapted to position the device on the magnetic yoke member during placement of the device on the magnetic yoke member, and the housing may be adapted to rest against the magnetic yoke member.

The device may include an arrangement adapted to displace the magnetic element and including a screw configured to cooperate with a thread in the upper plate to raise the upper plate and the magnetic element relative to the housing in accordance with turning of the screw.

A lower part of the screw may be connected to a sleeve that extends vertically in a direction of the housing, and the sleeve may be adapted to rest against the housing during turning of the screw.

The device may include an arrangement adapted to maintain the nonmagnetic support in a lower position and near the magnetic yoke member when the magnetic element is raised.

According to an example embodiment of the present invention, a device for positioning and affixing magnets to a magnetic yoke member of a motor includes: nonmagnetic support means for receiving the magnets, a shape of the nonmagnetic support means complementary to a shape of the magnetic yoke member; magnetic means for holding the magnets in position on the nonmagnetic support means, the magnetic means arranged on an opposite side of the nonmagnetic support means than the magnets, the magnetic means exerting a magnetic attraction on the magnets greater than a magnetic attraction exerted by the magnetic yoke member during positioning of the device with respect to the magnetic yoke member; and means for varying at least one of (a) the magnetic attraction of the magnetic yoke member on the magnets and (b) the magnetic attraction of the magnetic means on the magnets to render the magnetic attraction of the magnetic yoke member on the magnets greater than the magnetic attraction of the magnetic means on the magnets.

Other characteristics and aspects of example embodiments of the present invention are described below in the following description with reference to the appended Figures. The following describes a non-limiting example embodiment of a device for positioning and affixing magnets on a magnetic yoke member of a motor and steps for implementing the method.

DETAILED DESCRIPTION

Figure 1A:
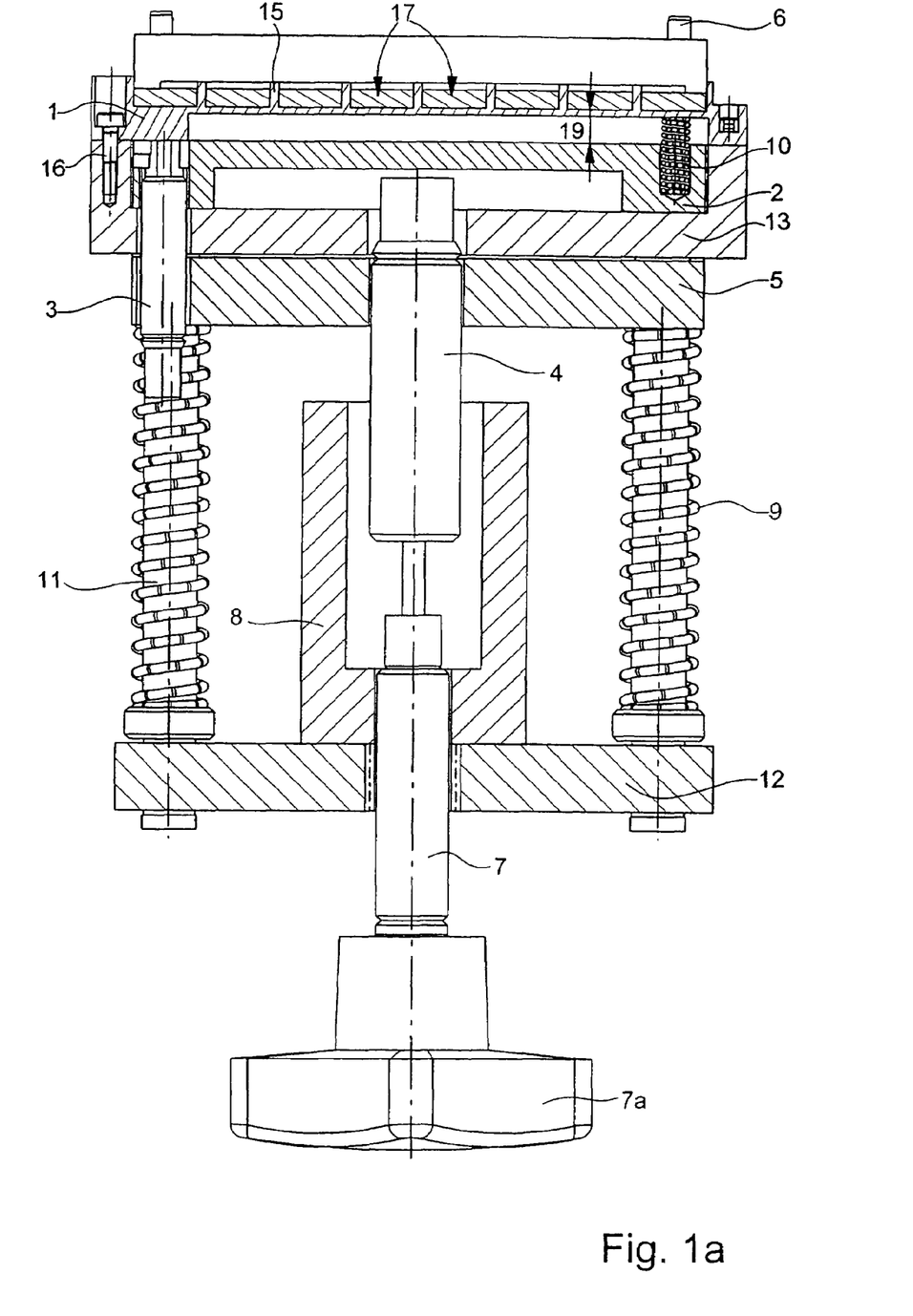
FIG. 1a is a cross-sectional view of an example embodiment of a device as it appears during an initial step of arranging magnets on this device.
Figure 1B:
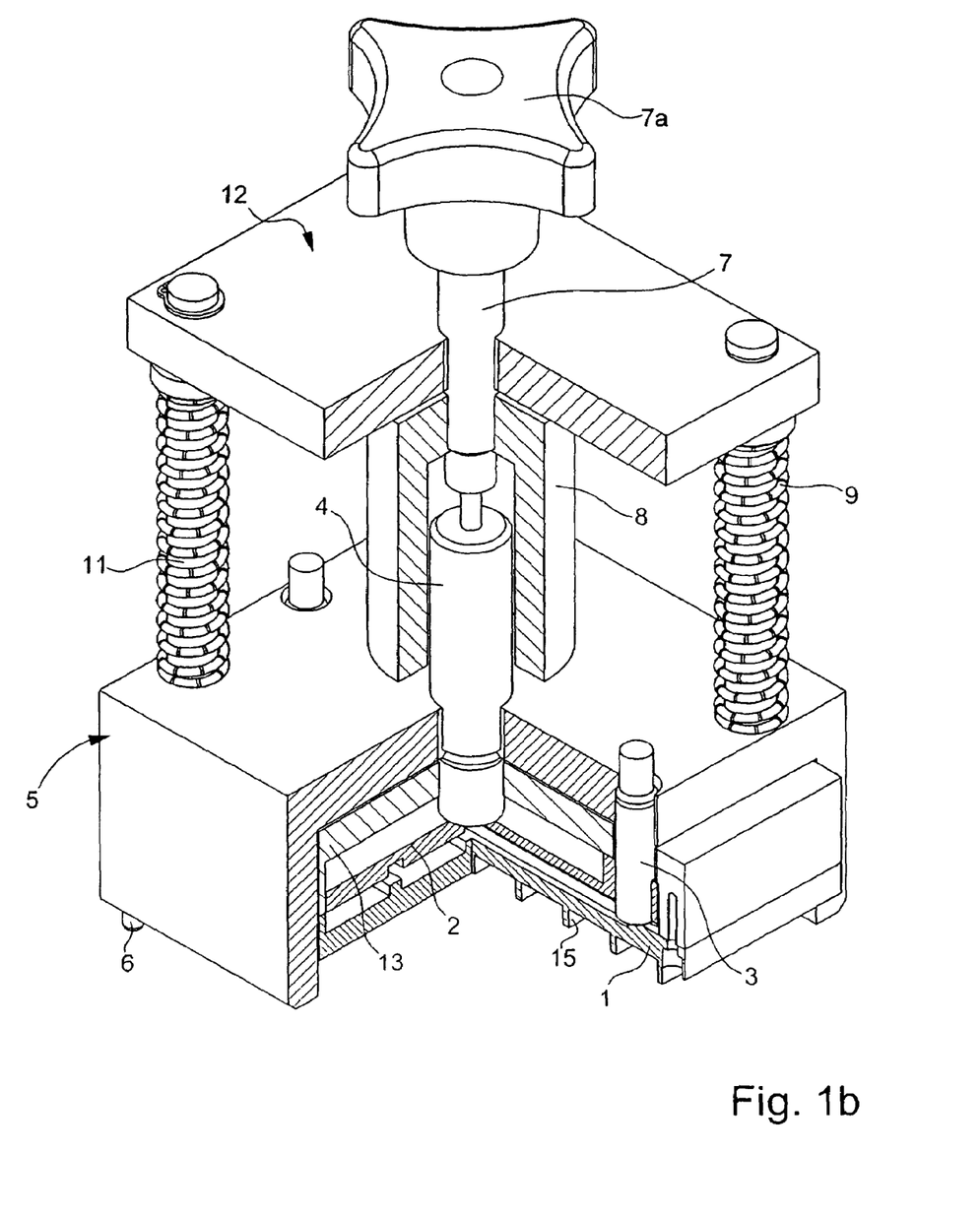
FIG. 1b is a partial cross-sectional perspective view of the device.
Figure 1C:
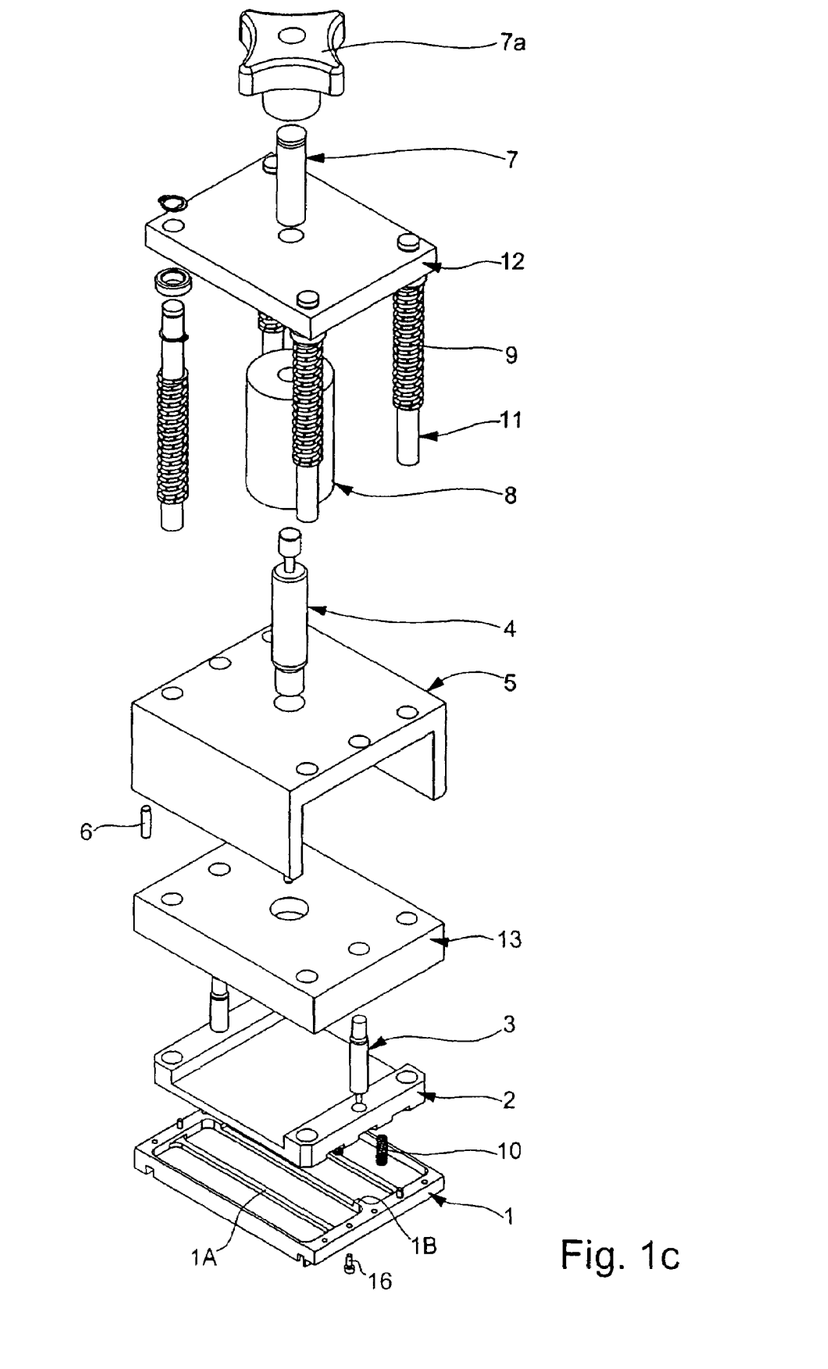
FIG. 1c is an exploded view of the device.

Referring to FIGS. 1a, 1b, and 1c, which illustrate the device in various complementary manners, it is illustrated that the device includes four parts. A first part, forming the chassis of the device, includes upper plate 12, four vertical rods 11, and magnetic element 2 connected to this upper plate 12 by the rods 11. A second part includes housing 5, which, as described below, rests on the magnetic yoke member of the motor and is maintained in position by pins 6 during the positioning of the magnets above the motor yoke. A third part includes nonmagnetic support 1 and cap 13 on which nonmagnetic support 1 is attached by bolts 16. Magnetic element 2 is located between support 1 and the upper part of cap 13. The fourth part includes screw 7 with its tightening knob 7a, the screw being connected to sleeve 8 extending the screw vertically and having its upper part attached to screw 7. This screw 7 is screwed into internal or screw threads in upper plate 12.

Rods 11 travel freely through the upper part of housing 5. Springs 9 are wrapped around these rods and maintain the distance between housing 5 and upper plate 12. Rods 11 flow freely through the upper part of cap 13. Two hydraulic dampers 3 connect magnetic element 2 to support 1. Moreover, springs 10 are provided between this magnetic element and the nonmagnetic support to exert a spreading force between this element and this support.

The fourth part, including screw 7 and sleeve 8, is connected to the second part, including housing 5, by hydraulic damper 4, which extends the screw on the one hand and is attached to housing 5 on the other, to dampen the descent of the first part and fourth part assembly.

Nonmagnetic support 1 has a shape corresponding to that of the magnetic yoke member of the motor on which the magnets are to be affixed. It is illustrated in the drawings as a flat plate, but may have, e.g., a circular shape, depending on the type of motor used and the shape of corresponding yoke 18. Nonmagnetic support 1 may be equipped with fins 15 for correct positioning of the magnets on it. The placement of magnets 17 on nonmagnetic support 1 may be provided by placing the device head down, e.g., in the position opposite that of placing magnets 17 on yoke 18. To stiffen support 1, ribs 1A are provided on its upper part. Reinforcements 1B are provided locally in the respective regions of dampers 3. Magnetic element 2 serves to maintain the magnets against support 1. This element 2 is positioned on the side opposite the magnets relative to support 1 and exerts a magnetic attraction on magnets 17, which varies during the process of positioning those magnets on yoke 18. During the initial step of arranging magnets 17 on nonmagnetic support 1 illustrated in FIG. 1a, magnetic element 2, in the form of a plate, exerts a weak attraction on the magnets since separation 19 between these and magnetic element 2 is considerable. This separation 19 is, for example, 7 mm. To maintain this separation, springs 10 are provided between nonmagnetic support 1 and magnetic element 2. In this step, the upper face of this magnetic element may contact the lower face of the upper part of cap 13.

At this stage of the process, a line of glue may be deposited on each magnet, although this deposit may also take place after the step described below.

Figure 2:
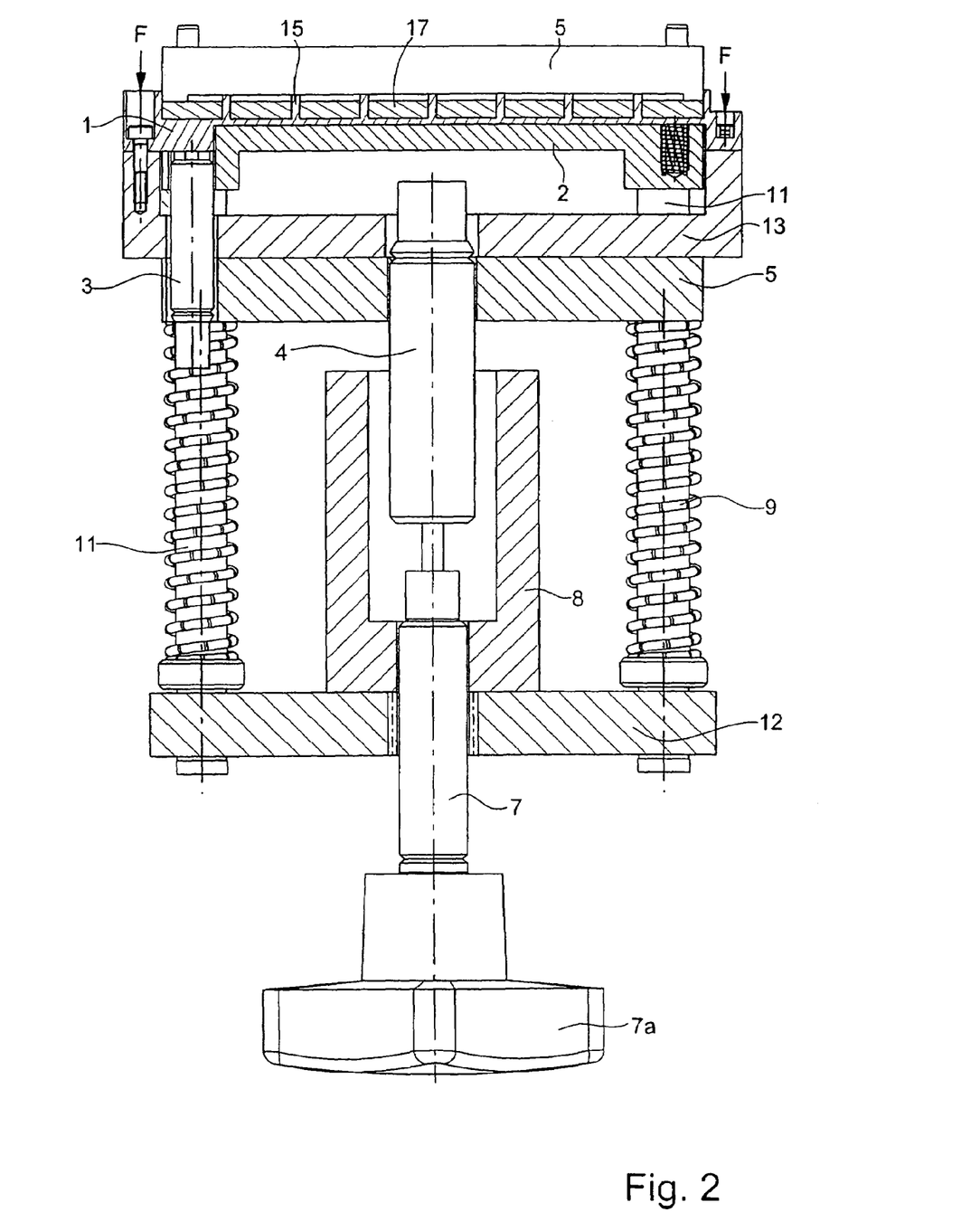
FIG. 2 is a cross-sectional view of the device as it appears during a step of maintaining the magnets on this device.

In the step illustrated in FIG. 2, vertical pressure F is applied to nonmagnetic support 1, the device remaining in its reverse position. This pressure may be provided by, for example, various mechanical devices or by manually resting the knob on a solid surface. Because of this pressure and the reaction of the knob, which exerts a pressure in the opposite direction on magnetic element 2 via upper plate 12 and rods 11, the magnetic element will be displaced toward the nonmagnetic support. As a result, separation 19 will decrease until magnetic element 2 comes to rest against nonmagnetic support 1. Magnets 17 are then strongly attracted by magnetic element 2 and thereby tightly held against nonmagnetic support 1. To avoid end-of-travel shock when element 2 is brought into contact with support 1, the device also includes hydraulic dampers 3, of which there are two, to dampen the contact between element 2 and support 1.

Figure 3:
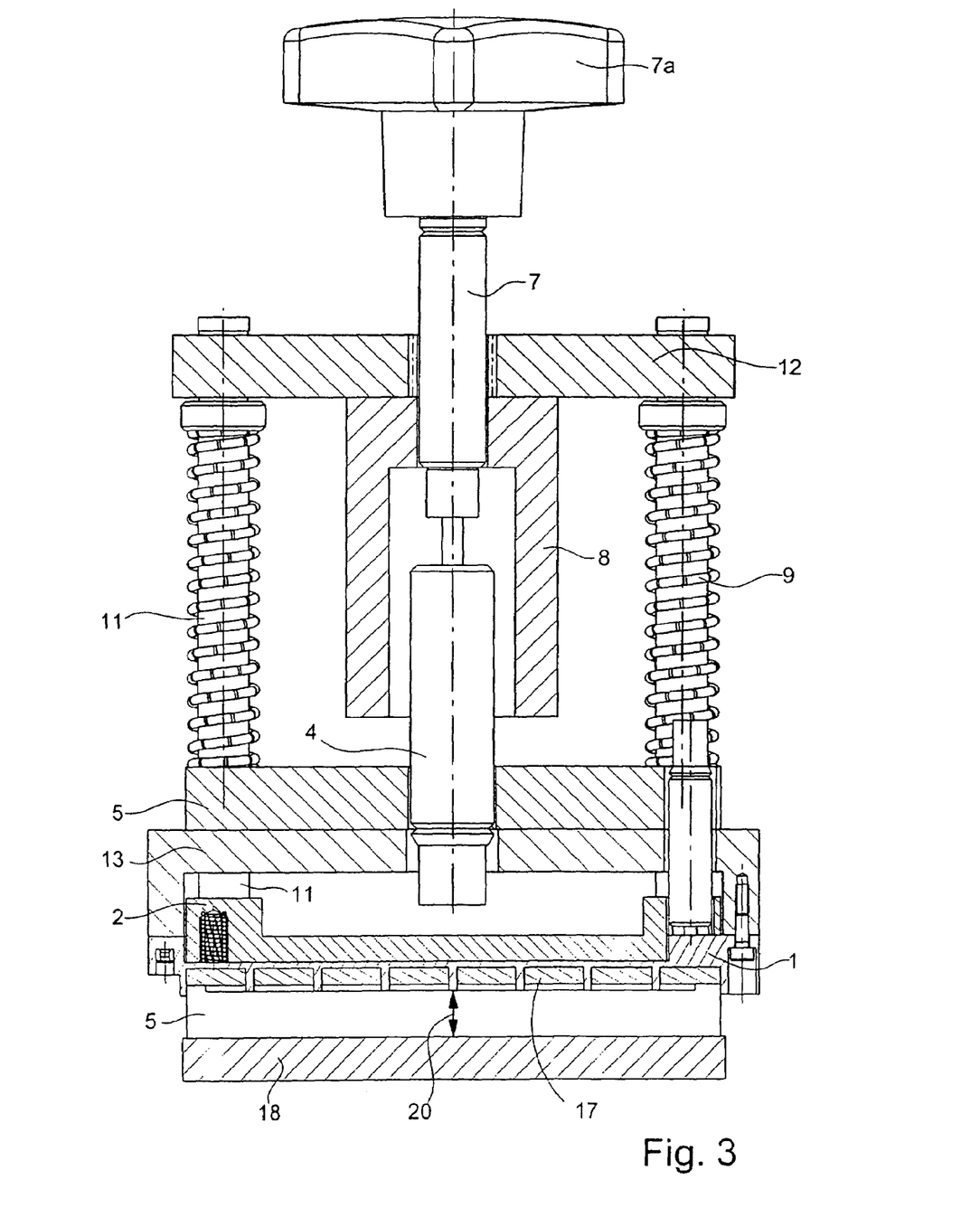
FIG. 3 is a cross-sectional view of the device as it appears during a step of positioning the device with respect to the magnetic yoke member of the motor.

As illustrated in FIG. 3, during the following step of positioning the device on the magnetic yoke member of the motor, the device is turned over, so as to present magnets 17 facing this magnetic yoke member 18 on which those magnets will be positioned and affixed by gluing. Because of the strong attraction of magnetic element 2 on magnets 17, these are maintained in the nonmagnetic support. The device may be maintained in position on yoke 18 by two pins 6, illustrated in FIGS. 1a and 1b. At the end of this step, separation 20 exists between magnets 17 and yoke 18. As illustrated, this distance 20 is greater (for example, 11 mm) than the distance between magnetic element 2 and the magnets. The magnetic attraction of element 2 is thus greater than that of yoke 18.

As illustrated in FIGS. 1a, 2, and 3, there exists a space between the lower part of sleeve 8 and housing 5, which allows for the downward movement of the sleeve-screw system.

Figure 4:
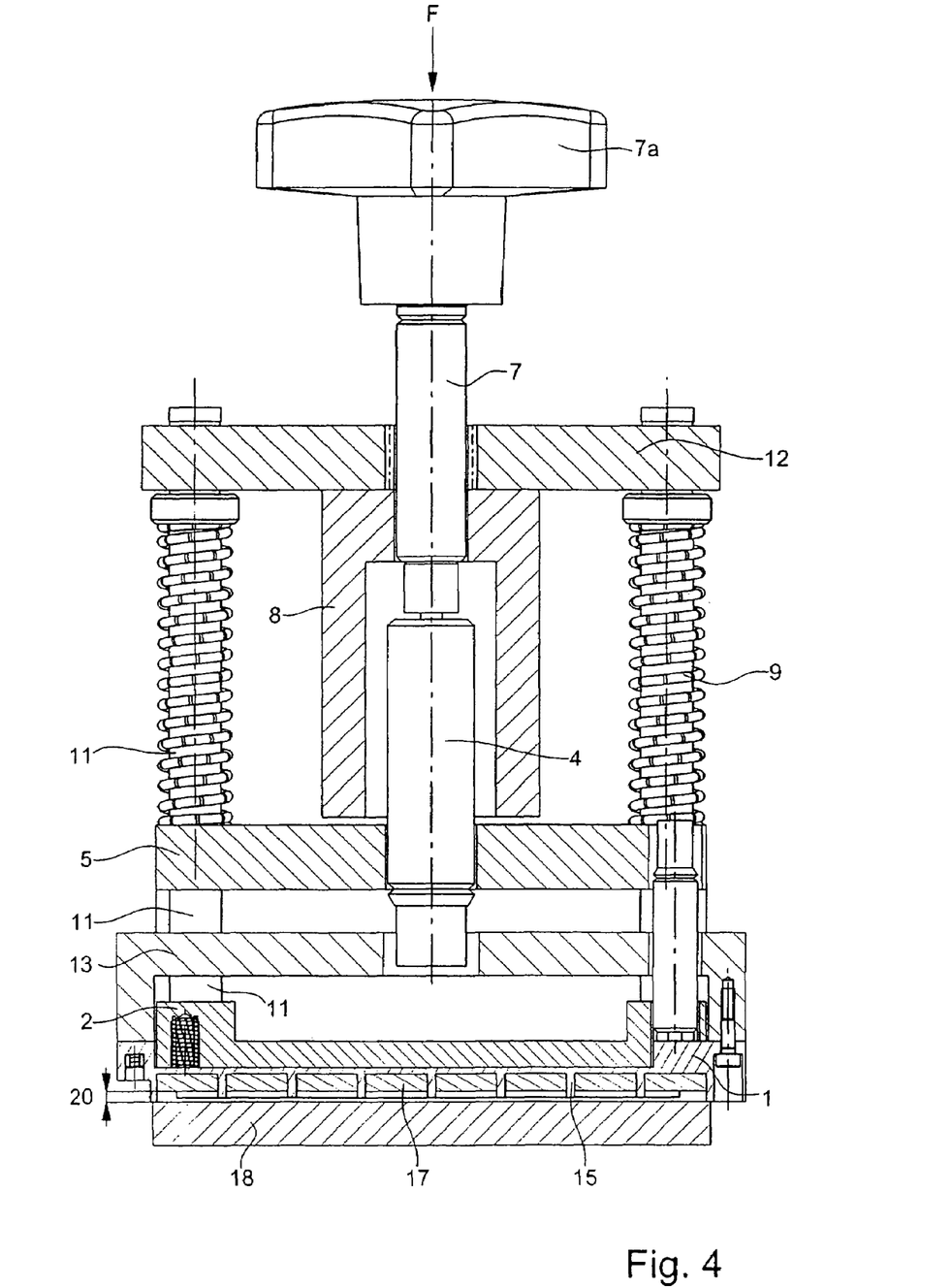
FIG. 4 is a cross-sectional view of the device as it appears during a first part of a step of transferring the magnets to the magnetic yoke member.

The operation shown in FIG. 4 illustrates a first part of the so-called variation of magnetic forces present step. Pressure is exerted on the positioning device in the direction of arrow F on upper plate 12 or on knob 7a. This has the effect of causing magnetic element 2 to descend and, consequently, nonmagnetic support 1 along with magnets 17, which reduces distance 20 between those magnets and magnetic yoke member 18. This distance then reaches approximately 2 mm. However, the magnets are always maintained on nonmagnetic support 1 by the attraction of magnetic element 2, which continues to remain somewhat greater than that of the yoke. During this operation, upper plate 12, sleeve 8, and screw 7 are lowered toward housing 5, against the return force of springs 9, wound in a spiral around rods 11. This return force is arranged so that it is less than the force of attraction of the yoke on the magnets in the position illustrated in FIG. 4. A space is created between cap 13 and the upper part of housing 5. The descent is controlled by damper 4, partially contained in sleeve 8 and attached, on the one hand, to an extremity of the screw and, on the other, to housing 5. After the descent is complete, the lower surface of sleeve 8 is near the upper surface of housing 5.

Figure 5:
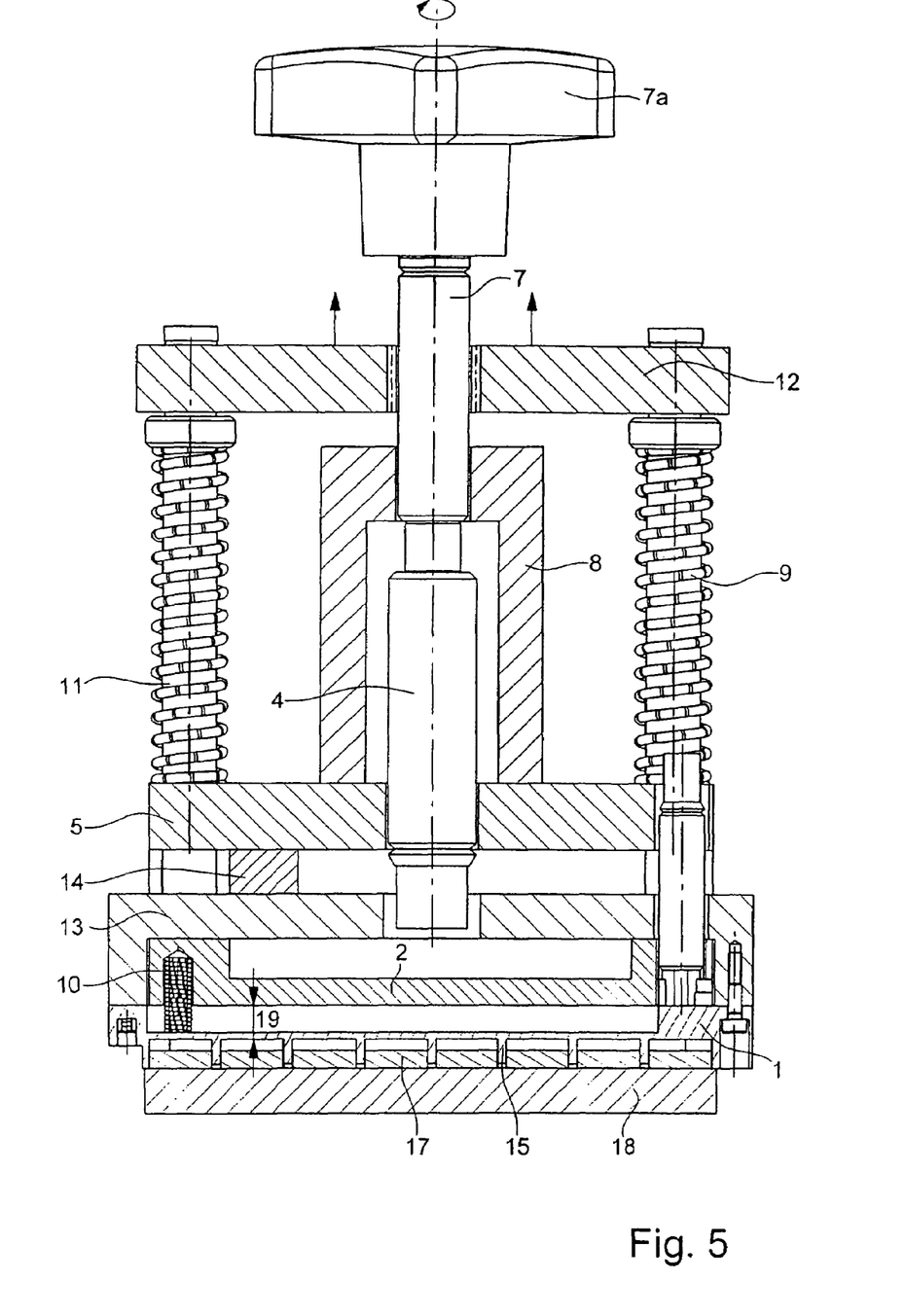
FIG. 5 is a cross-sectional view of the device as it appears during a second part of the step of transferring the magnets to the magnetic yoke member.

FIG. 5 illustrates a second part of the variation of magnetic forces step, with the transfer of magnets 17 to yoke 18. Note that a blocking device is used to prevent any contact between enclosure 13 and housing 5. This blocking device may include a shim 14, lodged between these two pieces in the example embodiment illustrated in FIG. 5. Screw 7 is then turned to cause upper plate 12 to rise and, consequently, magnetic element 2, once sleeve 8 comes to rest against housing 5. Distance 19 between element 2 and magnets 17 increases thereby. At a given moment, this distance 19 becomes greater than distance 20 between magnets 17 and magnetic yoke member 18. At that moment, magnets 17 leave their housing in support 1 and approach magnetic yoke member 18. Fins 15 guide the magnets during the transfer of the magnets to the yoke and maintain these latter in the correct position, at least during the initial gluing phase.

To avoid the use of shim 14 and the manipulation of screw 7, in an example embodiment, springs 10 may be sized such that they automatically separate element 2 from support 1 when those two parts reach the end of their travel at the culmination of the previous step. Other example embodiments are possible.

Figure 6:
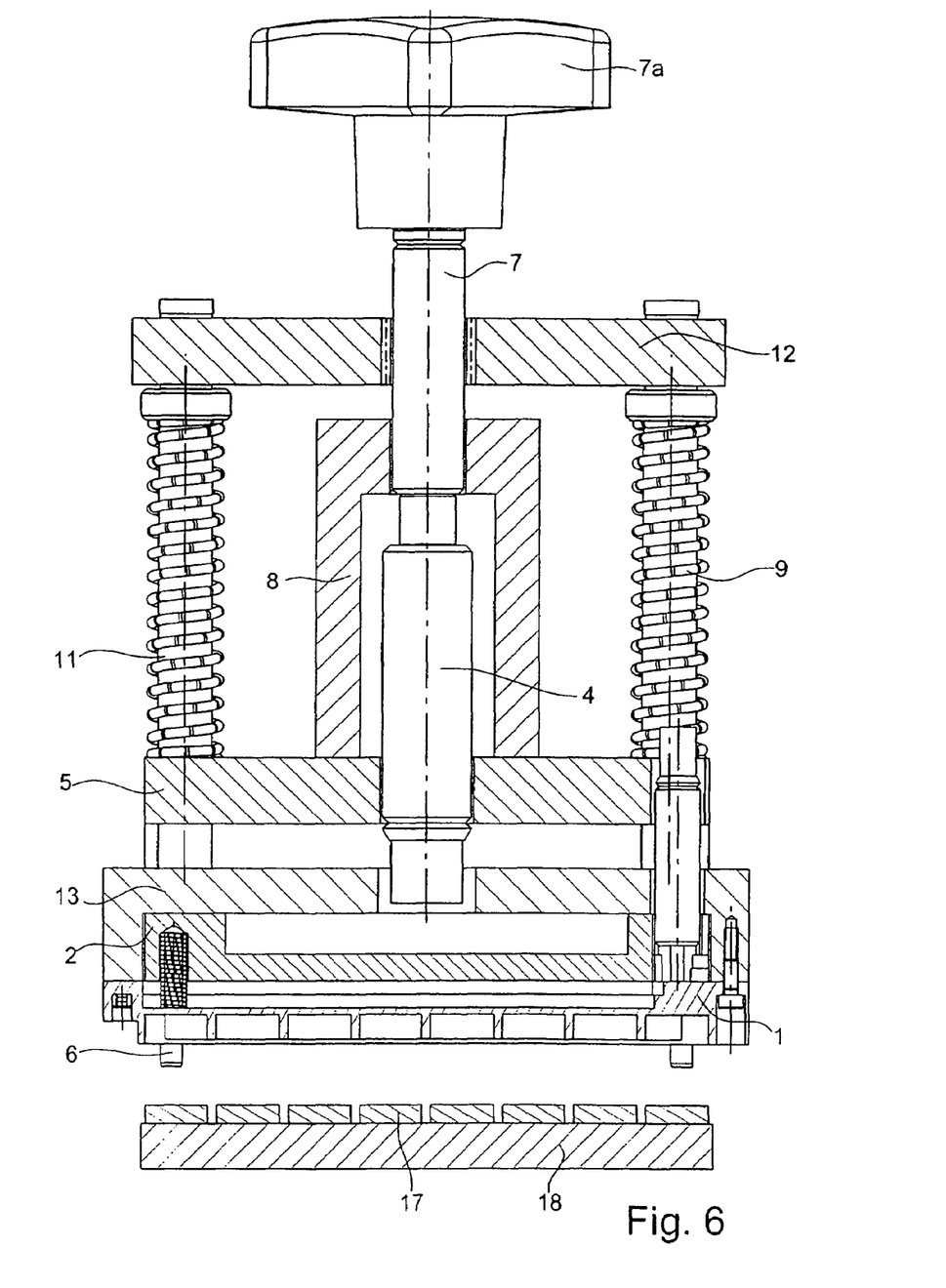
FIG. 6 is a cross-sectional view of the device as it appears during a step of withdrawing the device from the magnetic yoke member.

As illustrated in FIG. 6, the final step of the positioning and affixing process for magnets 17 includes disengaging the device from magnetic yoke member 18, by removing pins 6 of housing 5 from their corresponding hole in yoke 18. This disengagement may occur after the glue has dried or reached minimal polymerization so that the magnets do not move on the yoke after withdrawal of the device.

It is to be noted that many variants are possible without departing from the spirit and scope hereof. For example, the disposition of magnets on a face of a nonmagnetic support may occur while simultaneously maintaining those magnets in position on this support through the attractive effect of the magnetic element. In such an arrangement, inverting the device to position the magnets on the magnetic support may be superfluous. A possible magnet positioning arrangement separate from the device may be provided, in which the device is positioned above this arrangement to accept the magnets on the nonmagnetic support.

The method of affixing magnets on the magnetic yoke member illustrated in the drawings includes gluing, but other methods of attachment are also possible.

What is claimed is:

1. A device for positioning and affixing magnets to a magnetic yoke member of a motor, comprising:
    a nonmagnetic support adapted to receive the magnets, a shape of the nonmagnetic support complementary to a shape of the magnetic yoke member;
    a magnetic element adapted to hold the magnets in position on the nonmagnetic support, the magnetic element arranged on an opposite side of the nonmagnetic support than the magnets, the magnetic element adapted to exert a magnetic attraction on the magnets greater than a magnetic attraction exerted by the magnetic yoke member during positioning of the device with respect to the magnetic yoke member, the magnetic element is arranged as a lower part of a chassis, the chassis including vertical rods adapted to secure the magnetic element to an upper plate;
    an arrangement adapted to vary at least one of (a) the magnetic attraction of the magnetic yoke member on the magnets and (b) the magnetic attraction of the magnetic element on the magnets to render the magnetic attraction of the magnetic yoke member on the magnets greater than the magnetic attraction of the magnetic element on the magnets; and
    a housing vertically movable with respect to the chassis, the housing including an arrangement adapted to position the device on the magnetic yoke member during placement of the device on the magnetic yoke member, the housing adapted to rest against the magnetic yoke member.

2. The device according to claim 1, wherein the arrangement is adapted to displace the nonmagnetic support and the magnetic element in a direction of the magnetic yoke member to increase the magnetic attraction of the magnetic yoke member on the magnets.

3. The device according to claim 1, wherein the arrangement is adapted to displace the magnetic element to separate the magnetic element from the nonmagnetic support without reduction of a separation between the magnets and the magnetic yoke member.

4. The device according to claim 1, wherein the nonmagnetic support includes fins arranged on a disposition surface for the magnets and adapted to retain the magnets in position.

5. The device according to claim 1, wherein the nonmagnetic support is joined to a cap mounted to slide along the vertical rods of the chassis, the magnetic element arranged between the nonmagnetic support and an upper part of the cap.

6. The device according to claim 1, further comprising an arrangement adapted to displace the magnetic element and including a screw configured to cooperate with a thread in the upper plate to raise the upper plate and the magnetic element relative to the housing in accordance with turning of the screw.

7. The device according to claim 6, wherein a lower part of the screw is connected to a sleeve that extends vertically in a direction of the housing, the sleeve adapted to rest against the housing during turning of the screw.

8. The device according to claim 6, further comprising an arrangement adapted to maintain the nonmagnetic support in a lower position and near the magnetic yoke member when the magnetic element is raised.

* * * * *